United States Patent
Kim et al.

(10) Patent No.: US 10,488,689 B2
(45) Date of Patent: Nov. 26, 2019

(54) DISPLAY DEVICE

(71) Applicant: SAMSUNG DISPLAY CO., LTD., Yongin-si, Gyeonggi-do (KR)

(72) Inventors: Taechang Kim, Anyang-si (KR); Dongyeol Yeom, Suwon-si (KR); Joonchul Goh, Suwon-si (KR); Jaechang Choi, Yongin-si (KR); Jinkyu Park, Yongin-si (KR); Kiseok Cha, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/005,867

(22) Filed: Jun. 12, 2018

(65) Prior Publication Data

US 2018/0356672 A1 Dec. 13, 2018

(30) Foreign Application Priority Data

Jun. 13, 2017 (KR) ........................ 10-2017-0074063

(51) Int. Cl.
| | |
|---|---|
| *H05K 7/02* | (2006.01) |
| *H05K 7/04* | (2006.01) |
| *G02F 1/1333* | (2006.01) |
| *G02F 1/133* | (2006.01) |
| *G02F 1/1339* | (2006.01) |
| *G02F 1/1335* | (2006.01) |

(52) U.S. Cl.
CPC ...... *G02F 1/133308* (2013.01); *G02F 1/1339* (2013.01); *G02F 1/13306* (2013.01); *G02F 1/133528* (2013.01); *G02F 2001/133314* (2013.01); *G02F 2202/28* (2013.01)

(58) Field of Classification Search
USPC .......................................... 361/807, 809, 810
See application file for complete search history.

(56) References Cited

U.S. PATENT DOCUMENTS

| | | | |
|---|---|---|---|
| 8,876,358 B2 * | 11/2014 | Park | G02F 1/133308 349/58 |
| 9,086,526 B2 | 7/2015 | Ha et al. | |
| 9,128,314 B2 | 9/2015 | Yoon et al. | |
| 9,182,539 B2 | 11/2015 | Hwang et al. | |

(Continued)

FOREIGN PATENT DOCUMENTS

| | | |
|---|---|---|
| KR | 1020120077914 A | 7/2012 |
| KR | 1020120119804 A | 10/2012 |

(Continued)

*Primary Examiner* — Hung S. Bui
(74) *Attorney, Agent, or Firm* — Cantor Colburn LLP (57) ABSTRACT

A display device includes a display panel which displays an image; a mold frame including: a horizontal portion on which an edge of a back surface of the display panel is supported; and a vertical portion extending from the horizontal portion in a direction away from the display panel; an adhesive member between the horizontal portion of the mold frame and the back surface of the display panel; and a curable adhesive member between the horizontal portion of the mold frame and the back surface of the display panel, where the curable adhesive member is disposed spaced apart from the adhesive member along the horizontal portion of the mold frame to be disposed closer to the vertical portion of the mold frame than the adhesive member.

26 Claims, 8 Drawing Sheets

(56) References Cited

U.S. PATENT DOCUMENTS

| | | |
|---|---|---|
| 9,217,889 B2 | 12/2015 | Li |
| 9,332,665 B2 | 5/2016 | Hwang et al. |
| 9,759,950 B2 * | 9/2017 | Kim .................. G02F 1/133351 |
| 2010/0201908 A1 * | 8/2010 | Ishida ............... G02F 1/133308 349/58 |
| 2014/0176852 A1 * | 6/2014 | Ha .................... G02F 1/133308 349/58 |
| 2015/0002936 A1 | 1/2015 | Jun et al. |
| 2016/0341881 A1 | 11/2016 | Guo et al. |
| 2016/0363713 A1 | 12/2016 | Dubrow et al. |
| 2017/0192163 A1 * | 7/2017 | Oh ........................ G06F 1/1637 |
| 2017/0255050 A1 * | 9/2017 | Yoo ................... G02F 1/133308 |

FOREIGN PATENT DOCUMENTS

| | | |
|---|---|---|
| KR | 1020140020157 A | 2/2014 |
| KR | 101383207 B1 | 4/2014 |
| KR | 1020150004255 A | 1/2015 |

\* cited by examiner

DISPLAY DEVICE

This application claims priority to Korean Patent Application No. 10-2017-0074063, filed on Jun. 13, 2017, and all the benefits accruing therefrom under 35 U.S.C. § 119, the content of which in its entirety is herein incorporated by reference.

BACKGROUND

1. Field

Embodiments of the invention relate to a display device, and more particularly, to a display device improved in terms of coupling force between a display panel and a mold frame thereof.

2. Description of the Related Art

Display devices are classified into liquid crystal display ("LCD") devices, organic light emitting diode ("OLED") display devices, plasma display panel ("PDP") display devices and electrophoretic display devices based on a light emitting scheme thereof.

The display device includes a display panel displaying an image, various optical components for improving the optical characteristics of the display panel, and a frame for accommodating the display panel and the various optical components therein.

The frame includes a mold frame which supports an edge of a back surface of the display panel and provides a space for accommodating the various optical components; a bottom chassis at which various components such as the mold frame are accommodated; and a top chassis covering an edge of a front surface of the display panel.

SUMMARY

Embodiments of the invention may be directed to a frameless display device improved in terms of coupling force between a display panel and a mold frame.

According to an exemplary embodiment, a display device includes: a display panel which displays an image with light; a mold frame which supports the display panel thereon, the mold frame including: a horizontal portion on which an edge of a back surface of the display panel is supported; and a vertical portion extending from the horizontal portion in a direction away from the display panel; an adhesive member between the horizontal portion of the mold frame and the back surface of the display panel; and a curable adhesive member between the horizontal portion of the mold frame and the back surface of the display panel. The curable adhesive member is disposed spaced apart from the adhesive member along the horizontal portion of the mold frame to be disposed closer to the vertical portion of the mold frame than the adhesive member.

The adhesive member may directly contact the back surface of the display panel and the horizontal portion.

The curable adhesive member may directly contact the back surface of the display panel and the horizontal portion.

The mold frame may include a step portion protruding from the horizontal portion in a direction toward the display panel.

The step portion may be provided in plural to include: a first step portion lengthwise extending along an outer edge of the horizontal portion; and a second step portion lengthwise extending parallel to the first step portion spaced apart from the first step portion to define a trench therebetween in which the curable adhesive member and the adhesive member are disposed spaced apart from each other.

The first step portion may be disposed closer to the vertical portion of the mold frame than the second step portion.

The step portions of the mold frame may further include within the trench: a third step portion disposed between the first step portion and the second step portion, the third step portion lengthwise extending parallel to lengths of the first step portion and the second step portion.

Within the trench, the third step portion may be disposed between the curable adhesive member and the adhesive member.

From the horizontal portion of the mold frame, a height of each of the first, second and third step portions may be less than a thickness of the adhesive member.

Within the trench between the first and second step portion, a groove may be recessed into the horizontal portion in a direction away from the display panel, the groove defined between the first step portion and the second step portion, a length of the groove being parallel to lengths of the first step portion and the second step portion.

Within the trench, the groove may be defined between the curable adhesive member and the adhesive member.

The adhesive member may be a double-sided tape.

The curable adhesive member may include at least one selected from: a resin, an epoxy resin composition; a silicon resin composition; a modified epoxy resin composition such as a silicon-modified epoxy resin; a modified silicon resin composition such as an epoxy-modified silicon resin; a polyimid resin composition; a modified polyimide resin composition; polyphthalamide ("PPA"); a polycarbonate ("PC") resin; polyphenylene sulfide ("PPS"); a liquid crystal polymer ("LCP"); an acrylonitrile butadiene styrene ("ABS") resin; a phenol resin; an acrylic resin; and a polybutylene terephthalate ("PBT") resin.

The display device may further include: a driving circuit board a side of the display panel among plural sides thereof; and a flexible printed circuit board connecting the display panel and the driving circuit board to each other.

Among the plural sides of the display panel, the curable adhesive member may be disposed only at sides except for the side of the display panel at which the driving circuit board is disposed.

The display panel may include: a first substrate a back surface of which defines the back surface of the display panel; a second substrate opposing the first substrate; a lower polarizer at the back surface of the first substrate; and an upper polarizer at an upper surface of the second substrate.

The display device may further include a sealing member disposed along a side surface of the display panel closest to the vertical portion of the mold frame.

The sealing member may directly contact a back surface of the upper polarizer, the back surface of the polarizer facing the horizontal portion of the mold frame.

The display device may further include a bottom chassis coupled to the mold frame at the vertical portion thereof.

The bottom chassis may include at least one selected from, aluminum, aluminum alloy, magnesium, magnesium alloy, copper, copper alloy, and an electrogalvanized steel sheet.

According to an exemplary embodiment, a display device includes: a display panel which displays an image with light; a mold frame which supports the display panel thereon, the mold frame including: a horizontal portion on which an edge of a back surface of the display panel is supported; and a vertical portion extending from the horizontal portion in a direction away from the display panel; an adhesive member between the horizontal portion of the mold frame and the back surface of the display panel; and a curable adhesive member between the horizontal portion of the mold frame and the back surface of the display panel. The mold frame includes a step portion provided in plural each protruding from the horizontal portion thereof in a direction toward the display panel, the step portions including: a first step portion lengthwise extending along an outer edge of the horizontal portion closest to the vertical portion; and a second step portion lengthwise extending parallel to the first step portion, spaced apart from the first step portion to define a trench therebetween in which the curable adhesive member and the adhesive member are disposed spaced apart from each other.

The step portions of the mold frame further include within the trench a third step portion disposed between the first step portion and the second step portion, the third step portion lengthwise extending parallel to lengths the first step portion and the second step portion.

In a top plan view, the curable adhesive member disposed between the horizontal portion of the mold frame and the back surface of the display panel may be disposed to surround the adhesive member disposed between the horizontal portion of the mold frame and the back surface of the display panel.

Within the trench between the first and second step portion, a sub-trench may be defined between the second step portion and the third step portion, and the adhesive member may be disposed in the sub-trench between the second step portion and the third step portion.

Within the trench between the first and second step portion, a sub-trench may be defined between the first step portion and the third step portion, and the curable adhesive member may be disposed in the sub-trench between the first step portion and the third step portion.

Within the trench between the first and second step portion, a groove may be recessed into the horizontal portion in a direction away from the display panel, the groove defined between the first step portion and the second step portion, a length of the groove parallel to lengths of the first step portion and the second step portion.

The foregoing is illustrative only and is not intended to be in any way limiting. In addition to the illustrative exemplary embodiments and features described above, further exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, where.

DETAILED DESCRIPTION

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being related to another element such as being "on" or "below" another layer, area or plate, it may be directly on or below the other layer, area, or plate, or intervening layers, areas or plates may be present therebetween. Conversely, when a layer, area, or plate is referred to as being related to another element such as being "directly on" or "directly below" another layer, area, or plate, intervening layers, areas or plates may be absent therebetween.

The spatially relative terms "below," "beneath," "lower," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "physically and/or mechanically connected" to the other element such as being in direct connection therewith, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of variation for the particular value as determined by one of ordinary skill in the art, considering the measurement in question and the error associated with measurement of the particular quantity (i.e., the limitations of the measurement system). For example, "about" may mean within one or more standard variations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the invention and like reference numerals refer to like elements throughout the specification.

A frameless display device has been suggested in which a top chassis of a conventional display device is omitted in accordance with design requirements and the display panel is directly attached to a mold frame of the frameless display device such as using an adhesive tape or the like. However, in such a case, the adhesive force of a double-sided tape is reduced because a side surface of the adhesive tape is exposed, causing a problem that the display panel may be detached from the mold frame.

As used herein, a display device according to an exemplary embodiment is assumed to be a liquid crystal display ("LCD") device, but exemplary embodiments are not limited thereto. The display device according to an exemplary embodiment may be applied to an organic light emitting diode ("OLED") display device or a plasma display device.

In addition, as used herein, the display device according to an exemplary embodiment is assumed to include an edge type backlight unit, but exemplary embodiments are not limited thereto. In an exemplary embodiment, the display device may include a direct type backlight unit or a corner type backlight unit.

Figure 1:
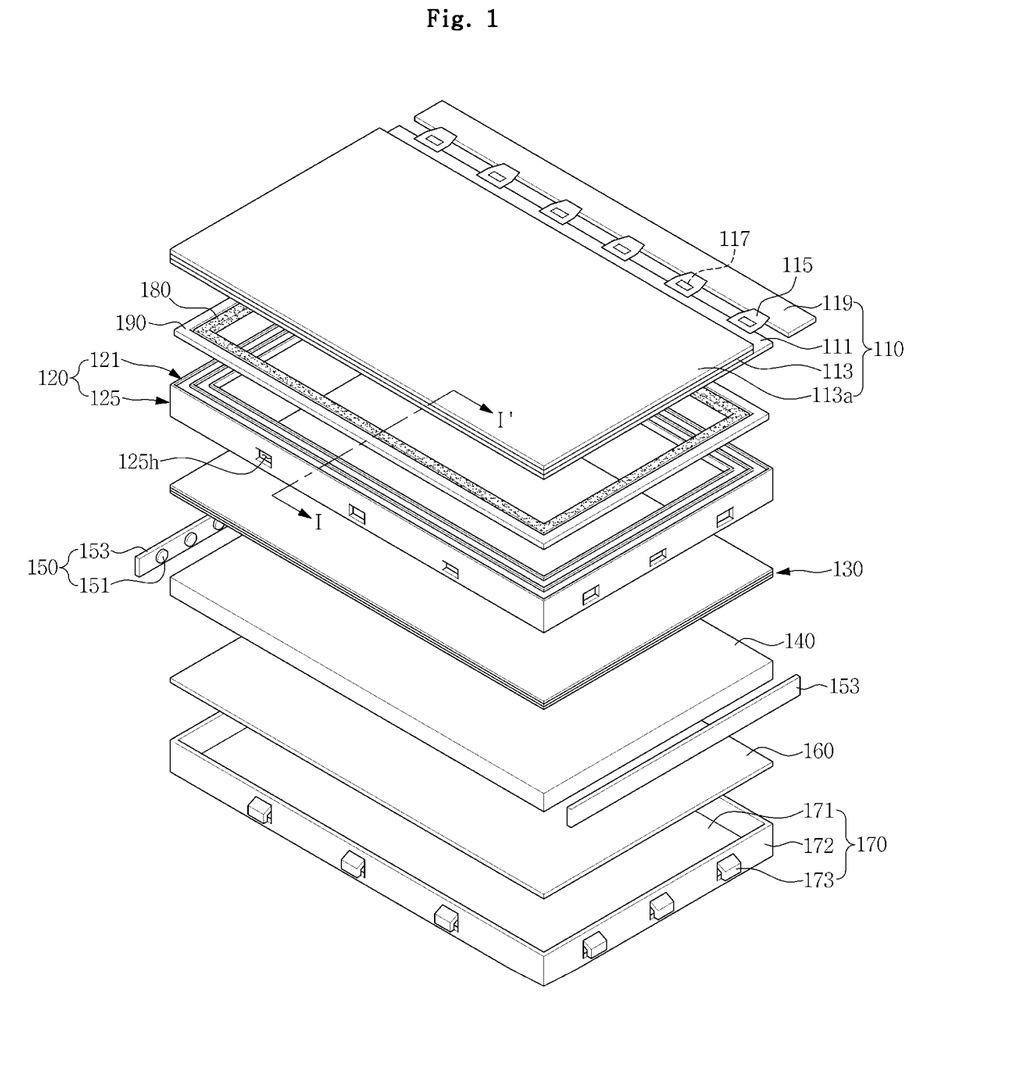
FIG. 1 is an exploded perspective view illustrating an exemplary embodiment of a display device according to the invention.
Figure 2:
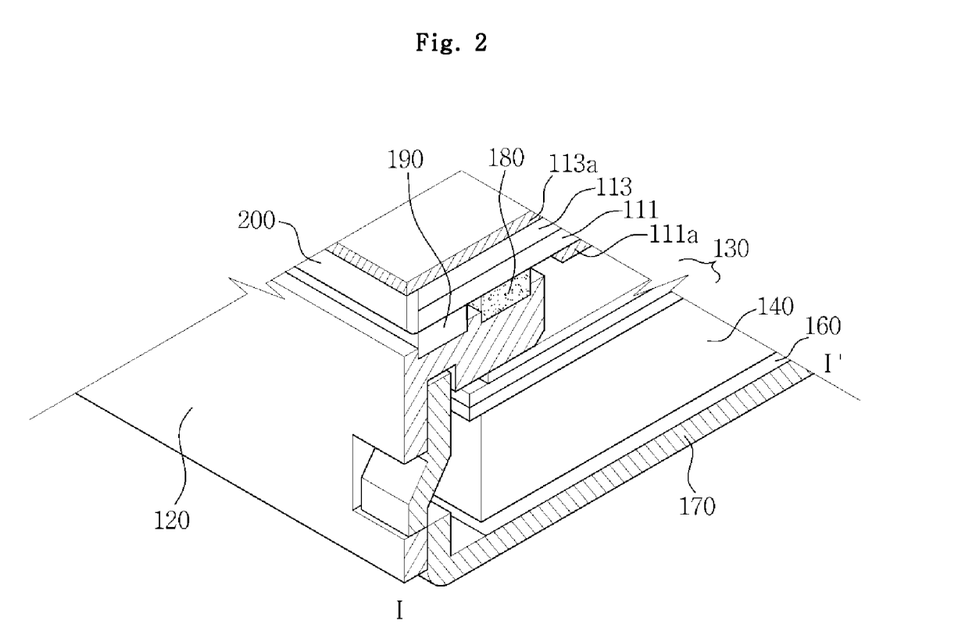
FIG. 2 is an enlarged perspective view taken along line I-I' of FIG. 1.
Figure 3:
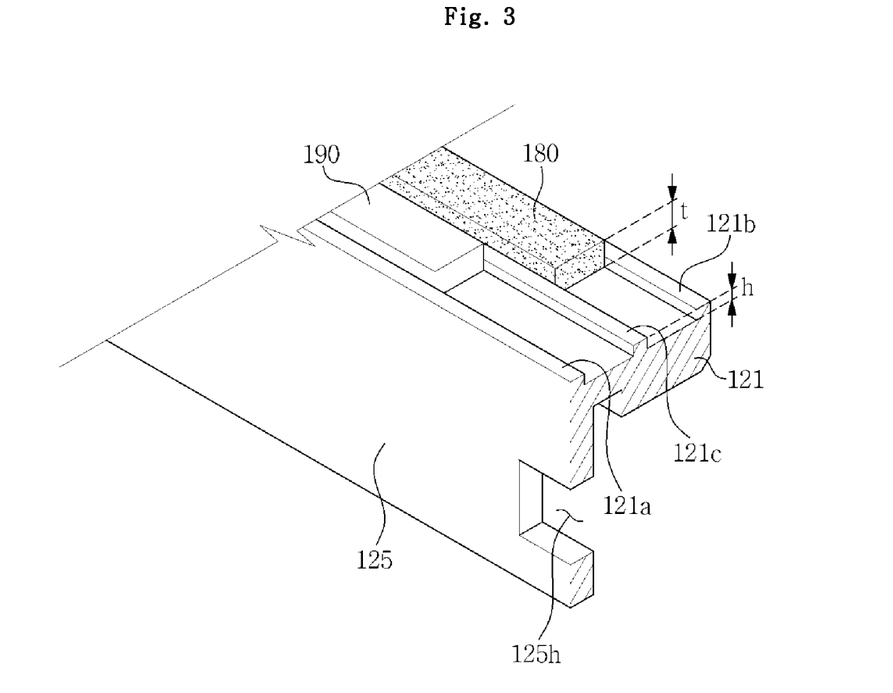
FIG. 3 is an enlarged perspective view illustrating a cross-section of an exemplary embodiment of a mold frame according to the invention.

FIG. 1 is an exploded perspective view illustrating an exemplary embodiment of a display device according to the invention, FIG. 2 is an enlarged perspective view taken along line I-I' of FIG. 1, and FIG. 3 is an enlarged perspective view illustrating a cross-section of an exemplary embodiment of a mold frame according to the invention.

Referring to FIGS. 1 and 2, an exemplary embodiment of the display device according to the invention includes a display panel 110, a mold frame 120, an optical sheet 130, a light guide plate 140, a light source portion 150, a reflection sheet 160, a bottom chassis 170, and the like. Hereinafter, the mold frame 120, the optical sheet 130, the light guide plate 140, the light source portion 150, the reflection sheet 160, the bottom chassis 170 and the like are collectively referred to as a backlight unit. The display device and components thereof are disposed in a plane defined by first and second directions, while a thickness of the display device and components thereof extends in a third direction crossing each of the first and second directions. The first to third directions may be perpendicular to each other without being limited thereto.

The display panel 110 may be provided in a quadrangular plate shape and may receive an electric signal from outside thereof and/or outside the display device to generate and display an image with light. The display panel 110 may include a first (panel) substrate 111, a second (panel) substrate 113 opposing the first substrate 111, and an optical control medium such as a liquid crystal layer (not illustrated) between the first substrate 111 and the second substrate 113. In a top plan view, the display panel 110 may have multiple sides or edges which form an overall shape of the display panel 110.

The first substrate 111 may include a plurality of pixel electrodes arranged in a matrix, a switching element such as a thin film transistor applying a control signal such as a driving voltage to each of the pixel electrodes, and various conductive signal lines through which control and/or driving signals are transmitted for driving the pixel electrodes and the thin film transistor.

The second substrate 113 is disposed to oppose the first substrate 111 in a thickness direction of the display panel 110. The second substrate 113 may include a common electrode and a color filter. The common electrode may include a transparent conductive material and the color filter may include red, green and blue color filters, without being limited thereto.

Although it is described that the first substrate 111 includes the pixel electrode and the second substrate 113 includes the common electrode and the color filter, exemplary embodiments are not limited thereto. In an exemplary embodiment, the common electrode may be disposed or formed within the first substrate 111 and the pixel electrode may be disposed or formed within the second substrate 113. In addition, the common electrode and the color filter may be disposed or formed within the first substrate 111. In addition, all of the pixel electrode, the common electrode, and the color filter may be disposed or formed within the first substrate 111.

The liquid crystal layer (not illustrated) is interposed between the first substrate 111 and the second substrate 113. An orientation of the material forming the liquid crystal layer is rearranged by an electric field formed between the pixel electrode and the common electrode. As such, the rearranged liquid crystal layer adjusts and controls the transmittance of a light emitted from the backlight unit which is incident to the display panel 110, and the adjusted light passes through the color filter to display an image to outside the display panel 110.

In addition, a lower polarizer 111a may be further disposed on a back surface of the first substrate 111 and an upper polarizer 113a may be further disposed on an upper surface of the second substrate 113. The upper polarizer 113a may have a planar area corresponding to a planar area of the second substrate 113 of the display panel 110.

In addition, the lower polarizer 111a may have a planar area corresponding to or less than a planar area of the first substrate 111. Referring to FIG. 2, the lower polarizer 111a may not cover a portion of at least two of four edges of the first substrate 111 to expose a portion of the back surface of the first substrate 111. At the exposed back surface of the first substrate 111, a fixing member such as an adhesive tape 180 and/or a curable adhesive 190, which will be described below, may directly contact the back surface of the first substrate 111.

A side sealing (member) 200 may further be disposed at side surfaces of the first substrate 111 and the second substrate 113. The side sealing 200 may serve to cover and protect a side surface of the display panel 110. The side sealing 200 may cover one or more of four side surfaces of the display panel 110, such as all four side surfaces of the display panel 110. The side sealing 200 may be in the form of a ring which surrounds all side surfaces of the display panel 110. In addition, the side sealing 200 may directly contact a back surface of the upper polarizer 113a at a portion thereof extended further than an edge of the display panel 110.

The upper polarizer 113a may transmit only a specific polarized light among light arriving from outside thereof to be incident thereto, and absorb or block the remaining light from outside thereof. The lower polarizer plate 111a may transmit only a specific polarized light among the light emitted from the backlight unit to be incident thereto, and absorb or block the remaining light from the backlight unit.

A driving circuit board 119 may be disposed at a side of the display panel 110. The driving circuit board 119 may be connected to the display panel 110. The driving circuit board 119 may generate various control and driving signals, and apply these various control and driving signals, such as a power signal, for driving the display panel 110 to generate and display an image.

The display panel 110 and the driving circuit board 119 may be electrically connected to each other by at least one flexible printed circuit board ("FPCB") 115. The FPCB 115 may be a chip on film ("COF") or a tape carrier package ("TCP"). Referring to FIG. 1, the FPCB may be disposed between the display panel 110 and the driving circuit board 119 in a first direction. Referring again to FIG. 1, the FPCB 115 may be provided in plurality arranged along a length of the driving circuit board 119 lengthwise extended in a second direction. The number of the FPCBs 115 may vary depending on the size and driving scheme of the display panel 110.

A driving chip 117 may be mounted on the FPCB 115. The driving chip 117 may generate various control and/or driving signals for driving the display panel 110. The driving chip 117 may be represented by a driver integrated circuit ("IC") and/or a source IC in which a timing controller and a data driving circuit are integrated into one chip.

The mold frame 120 supports an edge of a back surface of the display panel 110 and provides a space for accommodating therein the optical sheet 130, the light guide plate 140, the light source portion 150, the reflection sheet 160, or the like.

The mold frame 120 may have a polygonal frame shape in which a hollow space is defined. Portions of the frame shape may be respectively disposed at side surfaces of the display panel 110. In an exemplary embodiment, for example, the mold frame 120 may have a quadrangular frame shape in which an empty space is defined. The mold frame 120 may be disposed or formed into a single unitary member or may be formed as a plurality of separated pieces assembled to each other to form the frame shape.

Referring to FIGS. 1, 2 and 3, the mold frame 120 may include a horizontal portion 121 on which the edge of the back surface of the display panel 110 is supported and a vertical portion 125 which extends from an end of the horizontal portion 121 such as perpendicularly thereto. The vertical portion 125 may have or define a coupling groove 125h with which a protrusion portion 173 of the bottom chassis 170 is engaged, to be described below.

The mold frame 120 may include one or more step portions protruding from the horizontal portion 121 in a direction toward the display panel 110 along a thickness direction of the display device. The step portions may include a first step portion 121a having a length extending along one edge of the horizontal portion 121, a second step portion 121b having a length extending parallel to that of the first step portion 121a, and a third step portion 121c between the first step portion 121a and the second step portion 121b. With reference to an edge portion of the display panel illustrated in FIGS. 2 and 3, 5, the first step portion 121a may be disposed relatively outwardly as compared to the second step portion 121b. An outward direction may be defined in a direction toward the vertical portion 125 of the mold frame 120, while an inward direction may be defined in a direction away from the vertical portion 125, in a plane of the display device and/or a component thereof.

The adhesive tape 180 may be disposed at a trench defined between the second step portion 121b and the third step portion 121c so that the display panel 110 and the mold frame 120 may be coupled to each other by the adhesive tape 180. The adhesive tape 180 may be a double-sided tape and may be a black tape for reducing or effectively preventing light leakage at an edge portion of the display device. The adhesive tape 180 may represent a pre-formed member which holds a shape between pre-forming thereof and application thereof in a method of forming a display device, without being limited thereto.

The adhesive tape 180 may be disposed at four portions of the edge of the back surface the display panel 110, such as those portions of the edge corresponding to side surfaces or edges of the display panel 110. The adhesive tape 180 may be formed as a single unitary member having the form of a quadrangular loop as shown in FIG. 1, or may be disposed as separate portions. In an exemplary embodiment, for example, the adhesive tape 180 may include portions thereof disposed separately at each edge of the display panel 110, or may be disposed separately in an arbitrary area relative to a component of the display device.

The second step portion 121b and the third step portion 121c may serve to guide a position at which the adhesive tape 180 is to be disposed. A height 'h' of each of the second step portion 121b and the third step portion 121c in a thickness direction of the display device may be less than a thickness 't' of the adhesive tape 180.

The curable adhesive 190 may be disposed at a trench defined between the first step portion 121a and the third step portion 121c so that the display panel 110 and the mold frame 120 may be coupled to each other by the curable adhesive 190.

In FIG. 1, the curable adhesive 190 is depicted as being disposed at four portions of the edge of the back surface of the display panel 110, such as those portions of the edge corresponding to side surfaces or edges of the display panel 110, but exemplary embodiments are not limited thereto. In an exemplary embodiment, the curable adhesive 190 may be disposed at one or more edge of the back surface of the display panel 110. In an exemplary embodiment, for example, the curable adhesive 190 may be only disposed at edges of the display panel 110 except an edge at which the driving circuit board 119 is disposed.

The first step portion 121a and the third step portion 121c may serve to guide a position at which the curable adhesive 190 is to be disposed. In an exemplary embodiment of manufacturing a display device, the first step portion 121a may substantially reduce or effectively prevent a material for forming the curable adhesive 190 from overflowing to outside of the display device at the edge portion thereof, before being cured. In addition, the third step portion 121*c* may substantially prevent a material for forming the curable adhesive 190 from overflowing to the inside of the display device before being cured. The curable adhesive 190 may represent a material having no particular shape before application thereof relative to a component of a display device in a method of forming the display device, and which takes on a shape or is shaped by the component of the display device in applying and curing such material in the method of forming the display device, without being limited thereto.

The third step portion 121*c* may serve to separate the adhesive tape 180 from the curable adhesive 190.

The curable adhesive 190 may include at least one selected from the group consisting of: a resin, an epoxy resin composition; a silicon resin composition; a modified epoxy resin composition such as a silicon-modified epoxy resin; a modified silicon resin composition such as an epoxy-modified silicon resin; a polyimid resin composition; a modified polyimide resin composition; polyphthalamide ("PPA"); a polycarbonate ("PC") resin; polyphenylene sulfide ("PPS"); a liquid crystal polymer ("LCP"); an acrylonitrile butadiene styrene ("ABS") resin; a phenol resin; an acrylic resin; and a polybutylene terephthalate ("PBT") resin. In addition, the curable adhesive 190 may be a material substantially the same as a material included in the side sealing 200.

The optical sheet 130 is disposed on the light guide plate 140 and serves to diffuse and/or collimate a light directed from the light guide plate 140 toward the display panel 110. The optical sheet 130 may include a plurality of individual sheets such as a diffusion sheet, a prism sheet and/or a protection sheet. The diffusion sheet, the prism sheet and the protection sheet may be sequentially stacked on the light guide plate 140 in the order listed.

The prism sheet may collimate the light guided by the light guide plate 140, the diffusion sheet may diffuse the light collimated by the prism sheet, and the protection sheet may protect the prism sheet. A light having passed through the protection sheet may be directed toward the display panel 110.

The light guide plate 140 may uniformly supply the light provided from the light source portion 150, to the display panel 110. The light guide plate 140 may include a quadrangular plate, but exemplary embodiments are not limited thereto. The light guide plate 140 may include a light emission surface facing the display panel 110, a rear surface opposite to the light emission surface and side surfaces which connect the light emission and rear surfaces to each other. When a light emitting diode ("LED") chip is used as a light source to generate and emit light, the light guide plate 140 may have various patterns such as including predetermined grooves, protrusions or the like depending on the position of the light source, to distribute the light across the light guide plate 140 for uniformly supplying the light toward the optical sheet 130.

Although referred to as a plate for ease of description, the light guide plate 140 may be in a shape of a sheet or a film for reducing an overall thickness of the display device. As a plate, the light guide plate 140 may have a relatively large cross-sectional thickness for ease of description, but as a sheet or film shape, the cross-sectional thickness is smaller than that of the plate and is relatively small as compared to the planar size thereof, to achieve slimness of the display device. In other words, the light guide plate 140 is to be understood as having a concept including a plate and a film for guiding light.

The light guide plate 140 may include a light-transmissive material including, for example, acrylic resins, such as polymethylmethacrylate ("PMMA"), or polycarbonate ("PC") so as to guide light efficiently.

The light source portion 150 includes a light source 151 and a light source substrate 153 on which the light source 151 is disposed. The light source 151 may be provided in plural on the light source substrate 153. The light source 151 may be disposed at an edge portion or at a light incident side surface of the light guide plate 140. That is, the light source 151 may generate light and emit the light toward the edge portion or the light incident side surface of the light guide plate 140. The light source 151 may include at least one light emitting diode ("LED") or an LED chip. In an exemplary embodiment, for example, the light source 151 may be a gallium nitride (GaN)-based LED chip that emits blue light.

The number of the light sources 151 may vary in consideration of size and luminance uniformity of the display panel 110. The light source substrate 153 may be a printed circuit board ("PCB") or a metal PCB.

The light source portion 150 may be disposed at one side surface, opposite side surfaces or all four side surfaces among side surfaces of the light guide plate 140 in consideration of the size and luminance uniformity of the display panel 110. That is, the light source portion 150 may be disposed or formed on at least one edge portion of the light guide plate 140.

Although not illustrated in FIG. 1, a wavelength conversion portion (not illustrated) may be disposed between the light source portion 150 and the light guide plate 140. The wavelength conversion portion (not illustrated) may include a material for converting the wavelength of light. In an exemplary embodiment, for example, the wavelength conversion portion may convert a wavelength of a blue light generated and emitted from a blue LED light source within the light source portion 150, into a white light.

The reflection sheet 160 may include, for example, polyethylene terephthalate ("PET"), having reflectivity. One surface of a main body of the reflection sheet 160 may be coated with a diffusion layer including, for example, titanium dioxide, to provide a reflective function. In addition, the reflection sheet 160 may include a material including a metal such as silver (Ag), having reflectivity to provide the reflective function.

The bottom chassis 170 is coupled to the mold frame 120 and accommodates the optical sheet 130, the light guide plate 140, the light source portion 150, the reflection sheet 160, and the like therein. The bottom chassis 170 maintains the overall framework of the display device and protects various components accommodated therein.

The bottom chassis 170 may include a back surface portion 171, a side wall portion 172 extending from the back surface portion 171 such as perpendicularly therefrom, and the protrusion portion 173 protruding outwardly from the side wall portion 172.

The protrusion portion 173 may be inserted into the coupling groove 125*h* of the mold frame 120 so that the mold frame 120 and the bottom chassis 170 may be coupled to each other. However, exemplary embodiments are not limited thereto, and the mold frame 120 and the bottom chassis 170 may be coupled to each other in various methods known in the pertinent art.

The bottom chassis 170 may include a metal material having good rigidity and heat dissipation characteristics. In an exemplary embodiment, for example, the bottom chassis 170 may include at least one selected from the group consisting of stainless steel, aluminum, an aluminum alloy, magnesium, a magnesium alloy, copper, a copper alloy and an electrogalvanized steel sheet.

As such, by disposing the adhesive tape 180 and the curable adhesive 190 between the display panel 110 and the mold frame 120 within in the display device according to an exemplary embodiment, a frameless display device improved in terms of the coupling force between the display panel 110 and the mold frame 120 may be provided. As the frameless display device, the second polarizer 113a may form the outermost surface of the display device at the viewing side thereof, without being limited thereto.

Figure 4:
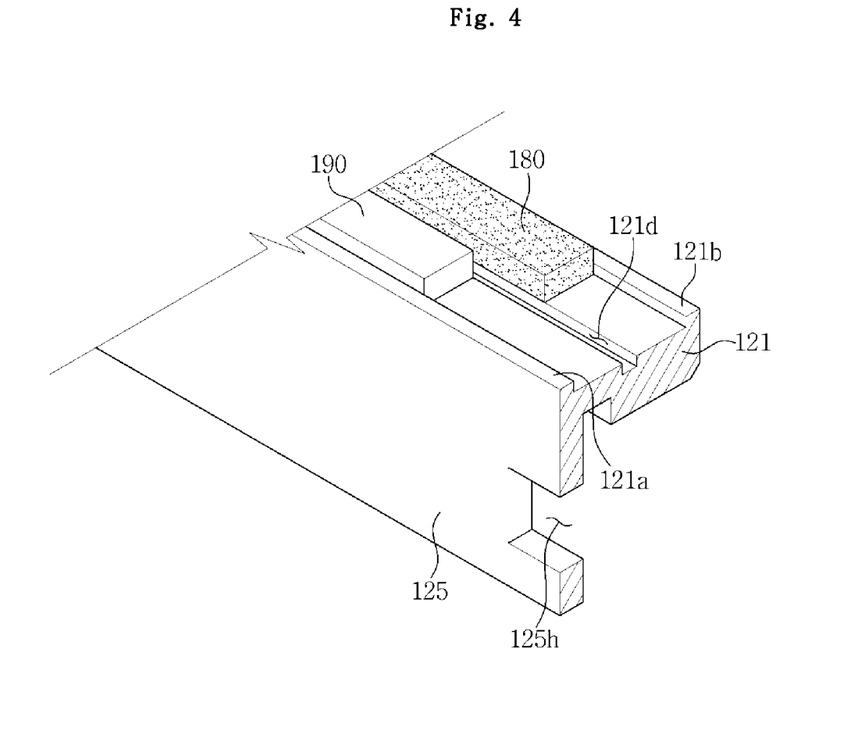
FIG. 4 is an enlarged perspective view illustrating a cross-section of an alternative exemplary embodiment of a mold frame according to the invention.

FIG. 4 is an enlarged perspective view illustrating a cross-section of an alternative exemplary embodiment of a mold frame according to an alternative exemplary embodiment. The descriptions of the mold frame according to the previous exemplary embodiment will be omitted from the descriptions related to the mold frame according to the alternative exemplary embodiment.

Referring to FIG. 4, a mold frame 120 according to an alternative exemplary embodiment includes a horizontal portion 121 supporting an edge of a back surface of a display panel 110 and a vertical portion 125 which is bent from the horizontal portion 121 to extend therefrom such as perpendicularly therefrom.

The mold frame 120 may include one or more step portion protruding from the horizontal portion 121 in a direction toward the display panel 110.

The step portions may include a first step portion 121a having a length extending along one edge of the horizontal portion 121 and a second step portion 121b having a length extending parallel to that of the first step portion 121a. The first step portion 121a may be disposed relatively outwardly as compared to the second step portion 121b.

In addition, the mold frame 120 may have a groove 121d defined between the first step portion 121a and the second step portion 121b and having a length parallel to those of the first step portion 121a and the second step portion 121b. For a trench defined between the first step portion 121a and the second step portion 121b, the groove 121d is further recessed away from the display panel 110 from a bottom of the trench.

An adhesive tape 180 may be disposed between the second step portion 121b and the groove 121d so that the display panel 110 and the mold frame 120 may be coupled to each other. The adhesive tape 180 may be a double-sided tape and may be a black tape for reducing or effectively preventing light leakage.

The adhesive tape 180 may be disposed at four portions of an edge of a back surface the display panel 110. The adhesive tape 180 may be formed as a single unitary member having the form of a quadrangular loop as shown in FIG. 1, or may be disposed to be separated from each other. In an exemplary embodiment, for example, the adhesive tape 180 may be disposed as separate portions at each edge of the display panel 110, or may be disposed separately in an arbitrary area.

The second step portion 121b and the groove 121d may serve to guide a position at which the adhesive tape 180 is to be disposed. A height of the second step portion 121b may be less than a thickness of the adhesive tape 180.

A curable adhesive 190 may be disposed between the first step portion 121a and the groove 121d so that the display panel 110 and the mold frame 120 may be coupled to each other.

The curable adhesive 190 may be disposed at four portions of an edge of a back surface the display panel 110, but exemplary embodiments are not limited thereto. In an exemplary embodiment, the curable adhesive 190 may be disposed at one or more edge of the back surface of the display panel 110.

The first step portion 121a and the groove 121d may serve to guide a position at which the curable adhesive 190 is to be disposed. In an exemplary embodiment of manufacturing a display device, the first step portion 121a may substantially prevent a material for forming the curable adhesive 190 from overflowing to the outside of the display device, before being cured. In addition, the groove 121d may substantially prevent a material for forming the curable adhesive 190 from overflowing to the inside of the display device, before being cured.

The groove 121d may serve to separate the adhesive tape 180 and the curable adhesive 190 from each other.

As such, by disposing the adhesive tape 180 and the curable adhesive 190 between the display panel 110 and the mold frame 120 in the display device according to an exemplary embodiment, a frameless display device improved in terms of the coupling force between the display panel 110 and the mold frame 120 may be provided.

FIGS. 5, 6, 7 and 8 are perspective views illustrating an exemplary embodiment of a method of manufacturing a display device according to the invention. For purposes of illustration, FIGS. 5 to 8 may be views taken along line I-I' of FIG. 1.

Figure 5:
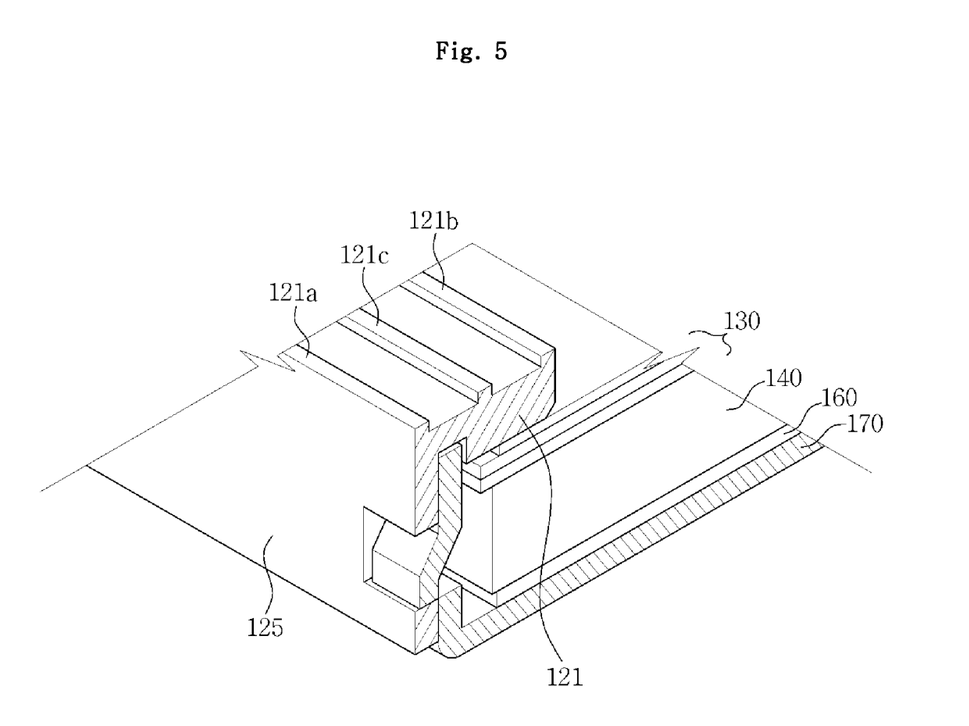
FIGS. 5, 6, 7 and 8 are enlarged perspective views illustrating an exemplary embodiment of a method of manufacturing a display device according to the invention.

Referring to FIG. 5, the reflection sheet 160, the light guide plate 140 and the optical sheet 130 are sequentially accommodated in the bottom chassis 170, and the bottom chassis 170 and the mold frame 120 are coupled to each other.

Figure 6:
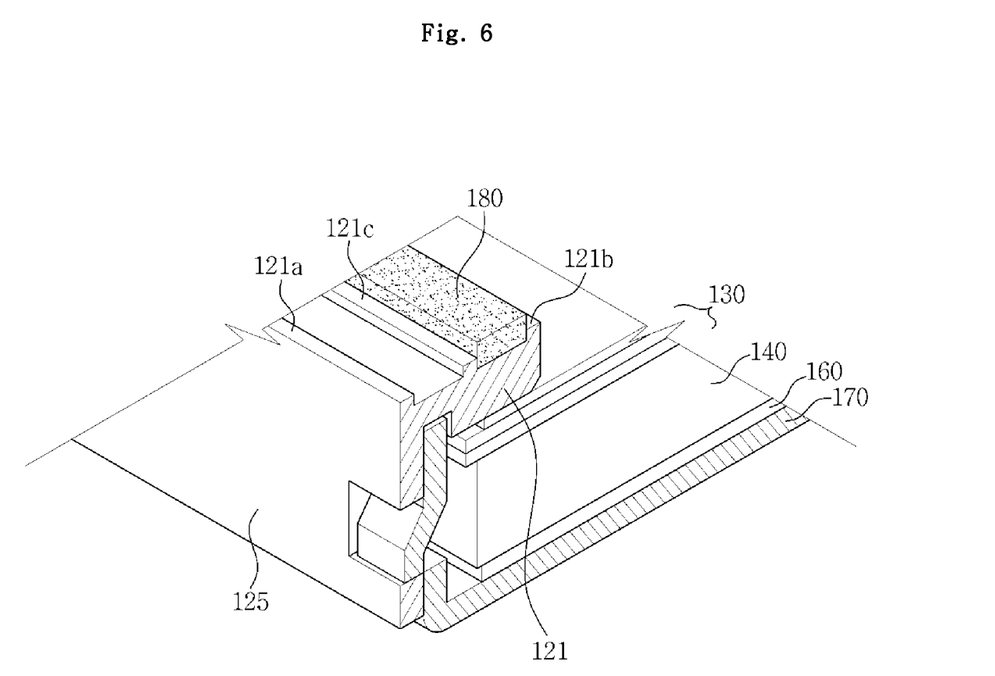

Referring to FIG. 6, the adhesive tape 180 is attached between the second step portion 121b and the third step portion 121c of the mold frame 120 coupled to the bottom chassis 170.

Figure 7:
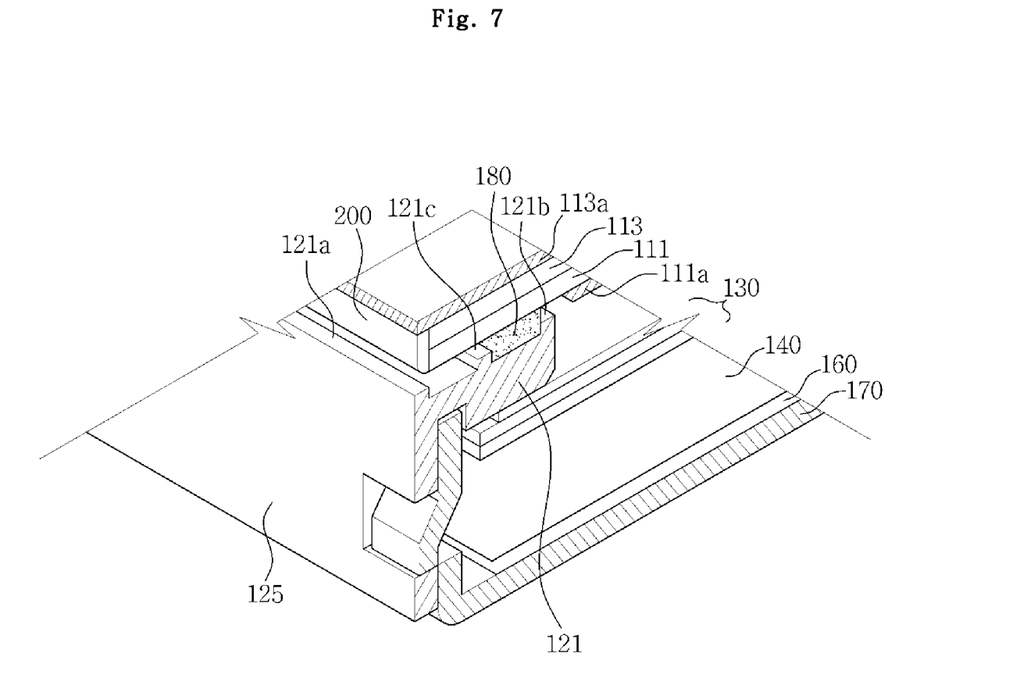

Referring to FIG. 7, the mold frame 120 and the display panel 110 are preliminary fixed to each other using the adhesive tape 180.

Figure 8:
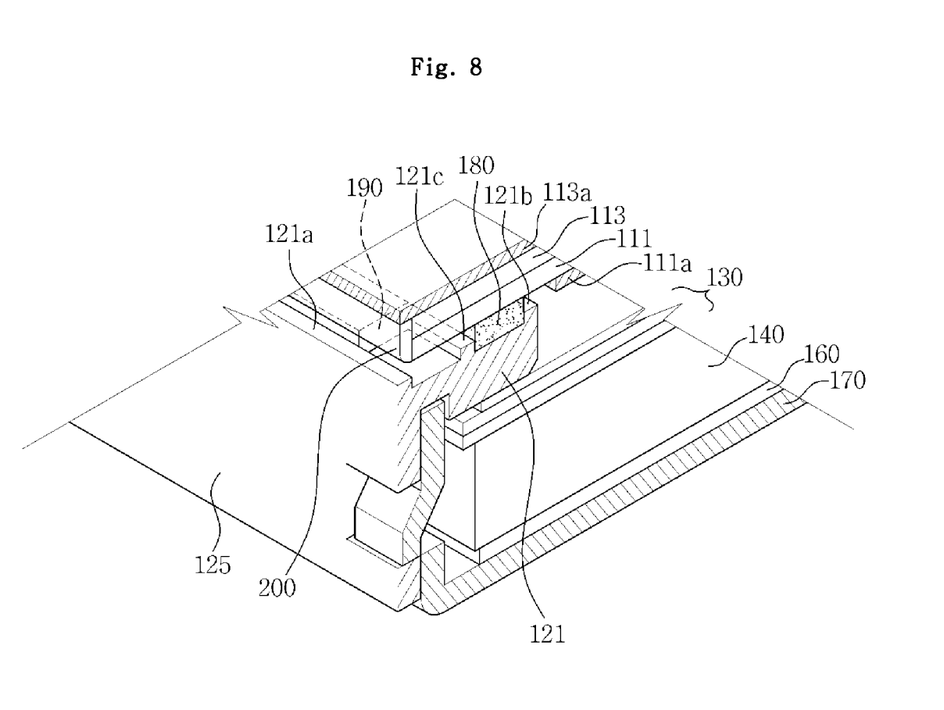

Referring to FIG. 8, with the mold frame 120 and the display panel 110 preliminary fixed to each other using the adhesive tape 180, a material for forming the curable adhesive 190 is injected between the mold frame 120 and the display panel 110. The display panel 110 with the mold frame 120 defines a space to which the material for forming the curable adhesive 190 is injected. Referring to FIGS. 7 and 8, a distal end of the first step portion 121a and the side sealing 200 may be spaced apart from each other to expose the space, without being limited thereto. In such an exemplary embodiment, the material for forming the curable adhesive 190 is injected so as not to overflow the first step portion 121a before being cured. The material for forming the curable adhesive 190 may be injected using, for example, a jetting nozzle (not illustrated).

The curable adhesive 190 may include at least one selected from the group consisting of: a resin, an epoxy resin composition; a silicon resin composition; a modified epoxy resin composition such as a silicon-modified epoxy resin; a modified silicon resin composition such as an epoxy-modified silicon resin; a polyimid resin composition; a modified polyimide resin composition; polyphthalamide ("PPA"); a polycarbonate ("PC") resin; polyphenylene sulfide ("PPS"); a liquid crystal polymer ("LCP"); an acrylonitrile butadiene styrene ("ABS") resin; a phenol resin; an acrylic resin; and a polybutylene terephthalate ("PBT") resin.

As such, by disposing the adhesive tape 180 and the curable adhesive 190 between the display panel 110 and the mold frame 120 in the display device according to one or more exemplary embodiment, a frameless display device improved in terms of the coupling force between the display panel 110 and the mold frame 120 may be provided.

As set forth hereinabove, in a frameless display device according to one or more exemplary embodiments, coupling force between a display panel and a mold frame may be improved by disposing more than one fixing member therebetween such as an adhesive tape and a curable adhesive between the display panel and the mold frame.

While the invention has been illustrated and described with reference to the exemplary embodiments thereof, it will be apparent to those of ordinary skill in the art that various changes in form and detail may be formed thereto without departing from the spirit and scope of the invention.

What is claimed is:

1. A display device comprising:
   a display panel which displays an image with light;
   a mold frame which supports the display panel thereon, the mold frame comprising:
      a horizontal portion on which an edge of a back surface of the display panel is supported; and
      a vertical portion extending from the horizontal portion in a direction away from the display panel;
   an adhesive member between the horizontal portion of the mold frame and the back surface of the display panel; and
   a curable adhesive member between the horizontal portion of the mold frame and the back surface of the display panel,
   wherein the curable adhesive member is disposed along the horizontal portion of the mold frame to be disposed closer to the vertical portion of the mold frame than the adhesive member.

2. The display device of claim 1, wherein the adhesive member directly contacts the back surface of the display panel and the horizontal portion of the mold frame.

3. The display device of claim 1, wherein the curable adhesive member directly contacts the back surface of the display panel and the horizontal portion of the mold frame.

4. The display device of claim 1, wherein the mold frame comprises a step portion protruding from the horizontal portion thereof, in a direction toward the display panel.

5. The display device of claim 4, wherein the step portion of the mold frame is provided in plural comprising:
   a first step portion lengthwise extending along an outer edge of the horizontal portion of the mold frame; and
   a second step portion lengthwise extending parallel to the first step portion, spaced apart from the first step portion to define a trench therebetween in which the curable adhesive member and the adhesive member are disposed spaced apart from each other.

6. The display device of claim 5, wherein the first step portion is disposed closer to the vertical portion of the mold frame than the second step portion.

7. The display device of claim 5, wherein the step portions of the mold frame further comprise within the trench: a third step portion disposed between the first step portion and the second step portion, the third step portion lengthwise extending parallel to lengths of the first step portion and the second step portion.

8. The display device of claim 7, wherein within the trench, the third step portion is disposed between the curable adhesive member and the adhesive member.

9. The display device of claim 7, wherein from the horizontal portion of the mold frame, a height of each of the first, second and third step portions is less than a thickness of the adhesive member.

10. The display device of claim 5, wherein within the trench between the first and second step portion, a groove is recessed into the horizontal portion in a direction away from the display panel, the groove defined between the first step portion and the second step portion, a length of the groove being parallel to lengths of the first step portion and the second step portion.

11. The display device of claim 10, wherein within the trench, the groove is defined between the curable adhesive member and the adhesive member.

12. The display device of claim 1, wherein the adhesive member is a double-sided tape.

13. The display device of claim 1, wherein the curable adhesive member comprises at least one selected from: a resin, an epoxy resin composition; a silicon resin composition; a modified epoxy resin composition such as a silicon-modified epoxy resin; a modified silicon resin composition such as an epoxy-modified silicon resin; a polyimid resin composition; a modified polyimide resin composition; polyphthalamide; a polycarbonate resin; polyphenylene sulfide; a liquid crystal polymer; an acrylonitrile butadiene styrene resin; a phenol resin; an acrylic resin; and a polybutylene terephthalate resin.

14. The display device of claim 1, further comprising:
   a driving circuit board disposed at a side of the display panel among plural sides thereof; and
   a flexible printed circuit board connecting the display panel and the driving circuit board to each other.

15. The display device of claim 14, wherein among the plural sides of the display panel, the curable adhesive member is disposed only at sides of the display panel except for the side thereof at which the driving circuit board is disposed.

16. The display device of claim 1, wherein the display panel comprises:
   a first substrate a back surface of which defines the back surface of the display panel;
   a second substrate opposing the first substrate;
   a lower polarizer at the back surface of the first substrate; and
   an upper polarizer at an upper surface of the second substrate.

17. The display device of claim 16, further comprising a sealing member disposed along a side surface of the display panel closest to the vertical portion of the mold frame.

18. The display device of claim 17, wherein the sealing member directly contacts a back surface of the upper polarizer, the back surface of the polarizer facing the horizontal portion of the mold frame.

19. The display device of claim 1, further comprising a bottom chassis coupled to the mold frame at the vertical portion thereof.

20. The display device of claim 19, wherein the bottom chassis comprises at least one selected from stainless steel, aluminum, aluminum alloy, magnesium, magnesium alloy, copper, copper alloy, and an electrogalvanized steel sheet.

21. A display device comprising:
   a display panel which displays an image with light;
   a mold frame which supports the display panel thereon, the mold frame comprising:
      a horizontal portion on which an edge of a back surface of the display panel is supported; and a vertical portion extending from the horizontal portion in a direction away from the display panel;

an adhesive member between the horizontal portion of the mold frame and the back surface of the display panel; and a curable adhesive member between the horizontal portion of the mold frame and the back surface of the display panel, wherein the mold frame comprises a step portion provided in plural each portion protruding from the horizontal portion thereof in a direction toward the display panel, the step portions comprising:

a first step portion lengthwise extending along an outer edge of the horizontal portion closest to the vertical portion; and     a second step portion lengthwise extending parallel to the first step portion, spaced apart from the first step portion to define a trench therebetween in which the curable adhesive member and the adhesive member are disposed.

22. The display device of claim 21, wherein the step portions of the mold frame further comprise within the first trench, a third step portion disposed between the first step portion and the second step portion, the third step portion lengthwise extending parallel to lengths the first step portion and the second step portion.

23. The display device of claim 22, wherein within the trench between the first and second step portion, a sub-trench is defined between the second step portion and the third step portion, and the adhesive member is disposed in the sub-trench between the second step portion and the third step portion.

24. The display device of claim 22, wherein within the trench between the first and second step portion, a sub-trench is defined between the first step portion and the third step portion, and the curable adhesive member is disposed in the sub-trench between the first step portion and the third step portion.

25. The display device of claim 21, wherein in a top plan view, the curable adhesive member disposed between the horizontal portion of the mold frame and the back surface of the display panel is disposed to surround the adhesive member disposed between the horizontal portion of the mold frame and the back surface of the display panel.

26. The display device of claim 21, wherein within the trench between the first and second step portion, a groove is recessed into the horizontal portion in a direction away from the display panel, the groove defined between the first step portion and the second step portion, a length of the groove parallel to lengths of the first step portion and the second step portion.

* * * * *